United States Patent [19]

Thunberg et al.

[11] 3,904,585

[45] Sept. 9, 1975

[54] PROCESS FOR RECOVERING GLYCINE AND BETA-ALANINE FROM SODIUM SULFATE SOLUTIONS

[75] Inventors: Jon C. Thunberg, Amherst, N.H.; Robert W. Bragdon, Marblehead, Mass.; William P. Moore, Hudson, N.H.

[73] Assignee: W. R. Grace & Co., New York, N.Y.

[22] Filed: Oct. 24, 1974

[21] Appl. No.: 517,469

Related U.S. Application Data

[63] Continuation-in-part of Ser. No. 442,543, Feb. 14, 1974, abandoned, Continuation-in-part of Ser. No. 319,539, Dec. 29, 1972, Pat. No. 3,808,269.

[52] U.S. Cl. .......................... 260/534 R; 260/534 C
[51] Int. Cl.² .......................................... C07C 51/42
[58] Field of Search ..................... 260/534 R, 534 C

[56] References Cited
UNITED STATES PATENTS
3,433,832  3/1969  Swanson .......................... 260/534 R Primary Examiner—Vivian Garner
Attorney, Agent, or Firm—Elton Fisher

[57] ABSTRACT

An amino acid selected from the group consisting of glycine and β-alanine is recovered from a starting solution of sodium sulfate and the amino acid by; (a) evaporating water from the solution to precipitate sodium sulfate and form a first mother liquor; (b) separating the first mother liquor and the precipitated sodium sulfate while the first mother liquor is hot; (c) cooling the separated first mother liquor to precipitate the amino acid and form a second mother liquor; (d) separating the precipitated amino acid and the second mother liquor; and (e) recovering the separated amino acid.

If desired, the separated second mother liquor can be admixed with a second lot of the starting solution and processed therewith.

15 Claims, No Drawings

PROCESS FOR RECOVERING GLYCINE AND BETA-ALANINE FROM SODIUM SULFATE SOLUTIONS

CROSS REFERENCE TO RELATED APPLICATIONS

This is a continuation-in-part of copending application Ser. No. 442,543, filed Feb. 14, 1974, and now abandoned. Said application Ser. No. 442,543 is a continuation-in-part of application Ser. No. 319,539, filed Dec. 29, 1972, and now U.S. Pat. No. 3,808,269.

BACKGROUND OF THE INVENTION

This invention is in the field of glycine and β-alanine. More specifically, this invention is directed to a process for preparing pure or substantially pure glycine or β-alanine.

In the prior art glycine and β-alanine have been prepared by; (a) hydrolyzing the corresponding nitrile ($NH_2CH_2CN$ in the case of glycine and $NH_2CH_2CH_2CN$ in the case of β-alanine) with an aqueous alkaline earth metal hydroxide to form an alkaline earth metal salt of the amino acid; and (b) treating the alkaline earth metal salt with carbon dioxide to form the free amino acid (which remains in solution) and an alkaline earth metal carbonate (which pecipitates). The amino acid is then recovered. This method, as applied to the preparation of glycine, is taught by U.S. Pat. No. 2,388,189 (Schweitzer, 260/534) and, as applied to the preparation of β-alanine, is taught by "Organic Syntheses," collective volume 3, pp. 34–36, John Wiley & Sons, Inc., 1955.

It is desirable to replace the alkaline earth metal hydroxide of the prior art with sodium hydroxide because the latter has a lower equivalent weight than strontium and barium hydroxides, is more soluble, is easier to handle under plant conditions, and the ions of sodium, unlike those of barium, (a preferred alkaline earth metal hydroxide) are not toxic. However, such substitution introduces a complication in the separation and recovery of the amino acid (glycine or β-alanine) because sodium carbonate, unlike the alkaline earth metal carbonates, is readily soluble in water, thereby to render the separation and recovery of pure or substantially pure glycine β-alanine difficult.

Another method for preparing certain amino acids from nitriles is to hydrolyze the appropriate nitrile with sodium hydroxide to form the sodium salt of the amino acid and to treat said salt with hydrochloric acid to form the free amino acid which is then separated from the resulting solution.

A method for separating certain free amino acids from a system comprising the amino acid, sodium chloride, and water is taught by U.S. Pat. No. 3,433,832 (Swanson et al, 260/534).

The Swanson et al method is not applicable to amino acids such as glycine and β-alanine which have a solubility greater than 35.0 parts per 100 parts of water at 100°C, and it is not generally applicable to aqueous solutions which contain significant amounts of sodium sulfate. The process of our invention has been found to present an effective and convenient method for recovering glycine or β-alanine from a system consisting essentially of water, glycine or β-alanine, and sodium sulfate. Such a system results where the amino acid (glycine or β-alanine) is formed from the corresponding nitrile by hydrolysis with sodium hydroxide followed by treatment with sulfuric acid to convert the intermediate sodium salt (sodium glycinate or sodium β-alaninate (sodium β-aminopropionate)) to the free amino acid (glycine or β-alanine).

SUMMARY OF THE INVENTION

In summary, this invention is directed to a process for recovering an amino acid selected from the group consisting of glycine and β-alanine from a starting aqueous solution of sodium sulfate and the amino acid, the starting aqueous solution having a temperature above 33°C, a pH of 4.5–8.5, a mole ratio of amino acid to sodium sulfate of 1–5:1 and containing at least 5% of the amino acid, said process comprising:

a. forming a first slurry having a temperature effective for preventing precipitation of the amino acid, the first slurry being a mixture of precipitated sodium sulfate and a first mother liquor, the first mother liquor being a second aqueous solution consisting essentially of sodium sulfate and the amino acid, by evaporating water from the starting solution while maintaining its temperature within a range (e.g., from 60° or 70°C up to the normal boiling point) effective for preventing the precipitation of the amino acid;

b. separating the first mother liquor from the precipitated sodium sulfate;

c. cooling the separated first mother liquor to a temperature within a range (e.g., 33°–40°C) effective for precipitating the amino acid to form a second slurry, the second slurry being a mixture of precipitated glycine or β-alanine and a second mother liquor, the second mother liquor being a third aqueous solution of sodium sulfate and the amino acid; and d. separating and recovering the precipitated amino acid.

DESCRIPTION OF PREFERRED EMBODIMENTS

In preferred embodiments of the process of the above Summary:

1. The pH of the starting solution is 4.5–8.5 or 5.5–6.5. If the pH of the first aqueous mixture is not within the desired range (4.5–8.5 or 5.5–6.5), it can be brought to this range by adding caustic soda or a sodium salt of the amino acid to increase the pH, or $H_2SO_4$ to lower the pH.

2. The mole ratio of amino acid to sodium sulfate in the starting aqueous solution is 1–5:1.

3. The amino acid is glycine.

4. The amino acid is β-alanine.

5. The amino acid is glycine, and the starting solution analyzes 21–25% glycine.

6. The amino acid is β-alanine, and the starting solution analyzes 34–43% β-alanine.

7. At least a portion (e.g., up to about 80–99 percent or 95–97 percent) of second mother liquor from a previous run is admixed with the starting solution before evaporating water therefrom. This procedure can be continued for an unlimited number of runs, thereby to prevent loss of amino acid contained in the second mother liquor. See Examples 2–3 and 6–8.

If highly pure amino acid (glycine or β-alanine) is desired the recovered (product) amino acid can be dissolved in hot water and recrystallized therefrom by cooling to form a solid phase consisting essentially of the recrystallized amino acid and a liquid phase consisting essentially of a solution of the amino acid in water.

The solid phase (amino acid) can be separated from the liquid phase and recovered. At least a portion (e.g., up to about 80–99 percent, or 90–98 percent, or 100 percent) of the liquid phase from which the solid phase was separated can be admixed with the starting solution of a subsequent run.

In another preferred embodiment (Embodiment A) this invention is directed to process for recovering an amino acid selected from the group consisting of glycine and β-alanine from a starting aqueous solution of sodium sulfate and the amino acid, the starting solution having a pH of 4.5–8.5, a mole ratio of amino acid to sodium sulfate of 1–5:1 and analyzing (containing) at least 5 percent of the amino acid, said process comprising:

a. forming a first slurry consisting essentially of a first crop of precipitated sodium sulfate and a first mother liquor by evaporating water from the starting aqueous solution at a temperature (e.g. from 60° or 70°C up to the normal boiling point) effective for preventing precipitation of the amino acid;

b. separating the first crop of precipitated sodium sulfate from the first mother liquor (e.g., by filtration, centrifugation, or decantation) at a temperature (e.g., from 60° or 70°C up to the normal boiling point) effective for preventing precipitation of the amino acid;

c. forming a second slurry consisting essentially of a first crop of precipitated amino acid and a second mother liquor by cooling the separated first mother liquor to a temperature (e.g., 33°–40°C) effective for precipitating the amino acid;

d. separating the first crop of precipitated amino acid from the second mother liquor (e.g., by filtration, decantation, or centrifugation) at a temperature (e.g., 33°–40°C) effective for preventing the precipitated amino acid from redissolving;

e. recovering the separated amino acid;

f. forming a third slurry consisting essentially of a second crop of precipitated sodium sulfate and a third mother liquor by evaporating water from the separated second mother liquor at a temperature (e.g., 60° or 70°C up to the normal boiling point) effective for preventing precipitation of the amino acid;

g. separating the second crop of precipitated sodium sulfate from the third mother liquor (e.g., by filtration, centrifugation, or decantation) at a temperature (e.g., from 60° or 70°C up to the normal boiling point) effective for preventing precipitation of the amino acid;

h. forming a fourth slurry consisting essentially of a second crop of precipitated amino acid and a fourth mother liquor by cooling the separated fourth mother liquor to a temperature (e.g., 33°–40°C) effective for precipitating the amino acid;

i. separating the second crop of precipitated amino acid from the fourth mother liquor (e.g., by filtration, centrifugation, or decantation) at a temperature (e.g., 33°–40°C) effective for preventing the precipitated amino acid from redissolving; and j. recovering the separated amino acid.

In certain embodiments of the invention of Embodiment A:

1. The amino acid is glycine.
2. The amino acid is β-alanine.
3. The mole ratio of amino acid to sodium sulfate in the starting aqueous solution is 1–5:1.
4. The pH of the starting aqueous solution is 4.5–8.5 or 5.5–6.5. If the pH of the starting aqueous solution is not within the desired range (e.g., 4.5–8.5 or 5.5–6.5), it can be adjusted and brought within this range by methods which are within the skill of those of ordinary skill in the art.
5. The separated third mother liquor or about 80–99 percent (preferably 95–97 percent thereof) is combined with separated first mother liquor from another run or with a fresh lot of the starting solution and the resulting mixture is processed.
6. The starting aqueous solution is prepared by reacting a sodium salt of the amino acid with an amount of sulfuric acid effective to convert the salt of the amino acid to free amino acid and sodium sulfate. The sodium salt of the amino acid is preferably prepared by reacting a nitrile ($H_2NCH_2CN$ in the case of glycine and $H_2NCH_2CH_2CN$ in the case of β-alanine) with an amount of aqueous sodium hydroxide solution effective for converting the nitrile to the corresponding sodium salt of the amino acid.
7. The separated second mother liquor or about 80–99 percent (preferably 95–99 percent) thereof is combined with separated second mother liquor from another run and the combined second mother liquors are processed together. The separated second mother liquor can be combined with a fresh lot of starting solution and processed therewith.

If highly pure amino acid (glycine or β-alanine) is desired the recovered (product) amino acid can be dissolved in hot water and recrystallized therefrom by cooling to form a solid phase consisting essentially of the recrystallized amino acid and a liquid phase consisting essentially of a solution of the amino acid in water. The solid phase (amino acid) can be separated from the liquid phase and recovered. At least a portion (e.g., up to about 80–99 percent, or 90–98 percent, or 100 percent) of the liquid phase from which the solid phase was separated can be admixed with the starting solution of a subsequent run.

In another preferred embodiment (Embodiment B) this invention is directed to a process for recovering an amino acid selected from the group consisting of glycine and β-alanine from a first aqueous starting solution consisting essentially of water, sodium sulfate, and the amino acid, the first starting solution having a pH of 4.5–8.5 or 5.5–6.5, a mole ratio of amino acid to sodium sulfate of 1–5:1 and analyzing (containing) at least 5 percent of the amino acid, said process comprising;

a. forming a first slurry consisting essentially of a first crop of precipitated sodium sulfate and a first mother liquor by evaporating water from the first aqueous starting solution at a temperature (e.g., from 60° or 70°C up to the normal boiling point) effective for preventing precipitation of the amino acid;

b. separating the first crop of precipitated sodium sulfate from the first mother liquor (e.g., by filtration, centrifugation, or decantation) at a temperature (e.g., from 60° or 70°C up to the normal boiling point) effective for preventing precipitation of the amino acid;

c. forming a second slurry consisting essentially of a first crop of precipitated amino acid and a second mother liquor by cooling the separated first mother liquor to a temperature (e.g., 33°–40°C) effective for precipitating the amino acid;

d. separating the first crop of precipitated amino acid from the second mother liquor (e.g., by filtration, decantation, or centrifugation) at a temperature (e.g., 33°–40°C) effective for preventing the precipitated amino acid from redissolving;

e. recovering the separated first crop of amino acid;

f. forming a second aqueous starting solution consisting essentially of water, sodium sulfate, and the amino acid, the second starting solution having a pH of 4.5–8.5 or 5.5–6.5 by admixing at least part of the second separated mother liquor with a second portion of the first aqueous starting solution;

g. forming a third slurry consisting essentially of a second crop of precipitated sodium sulfate and a third mother liquor by evaporating water from the second aqueous starting solution at a temperature (e.g., from 60° or 70°C to the normal boiling point) effective for preventing precipitation of the amino acid;

h. separating the second crop of precipitated sodium sulfate from the third mother liquor (e.g., by filtration, centrifugation, or decantation) at a temperature (e.g., from 60° or 70°C to the normal boiling point) effective for preventing precipitation of the amino acid;

i. forming a fourth slurry consisting essentially of a second crop of precipitated amino acid and a fourth mother liquor by cooling the separated third mother liquor to a temperature (e.g., 33°–40°C) effective for precipitating the amino acid;

j. separating the second crop of precipitated amino acid from the fourth mother liquor (e.g., by filtration, decantation, or centrifugation) at a temperature (e.g., 33°–40°C) effective for preventing the precipitated amino acid from redissolving; and k. recovering the separated second crop of amino acid.

In certain embodiments of the embodiment set forth in Embodiment B:

1. The first aqueous starting solution is prepared by reacting an aqueous solution of a sodium salt of the amino acid with an amount of sulfuric acid effective to convert the sodium salt of the amino acid to the free amino acid and sodium sulfate.

2. The pH of the first aqueous starting solution is 5.5–6.5.

3. The pH of the second aqueous starting solution is 5.5–6.5.

4. The amino acid is glycine.

5. The amino acid is β-alanine.

6. The amino acid is glycine, and the first aqueous starting solution analyzes 21–25% glycine.

7. The amino acid is β-alanine, and the first starting solution analyzes 34–43 percent β-alanine.

8. 80–99 percent (preferably 95–97 percent) of the second separated mother liquor is admixed with first aqueous starting solution to prepare the second aqueous starting solution.

9. The mole ratio of amino acid to sodium sulfate in the first aqueous starting solution is 1–5:1

10. At least a part of the separated fourth mother liquor is admixed with a third portion of the first aqueous starting solution to form a third aqueous starting solution which is then processed according to the general procedure of subparagraphs (g) through (j) of Embodiment B to recover amino acid therefrom.

If highly pure amino acid (glycine or β-alanine) is desired the recovered (product) amino acid can be dissolved in hot water and recrystallized therefrom by cooling to form a solid phase consisting essentially of the recrystallized amino acid and a liquid phase consisting essentially of a solution of the amino acid in water. The solid phase (amino acid) can be separated from the liquid phase and recovered. At least a portion (e.g., up to about 80–99 percent, or 90–98 percent, or 100 percent) of the liquid phase from which the solid phase was separated can be admixed with the starting solution of a subsequent run.

DETAILED DESCRIPTION OF THE INVENTION

Because of our disclosure it wil be readily apparent to those skilled in the art that water can be evaporated from the aqueous solutions of the above Summary, embodiment A, Embodiment B and the embodiments under said Summary, said Embodiment A, and said Embodiment A at a reduced pressure (i.e., a pressure under 760 mm of mercury absolute) at normal atmospheric pressure, or at an elevated pressure (i.e., a pressure greater than 760 mm of mercury absolute). However, no particular advantage is gained by using reduced or elevated pressures and we generally prefer to operate at atmospheric pressure.

Because of our disclosure it will be readily understood by those skilled in the art that starting aqueous solutions containing considerably more than 5% amino acid are preferred for use in the process of our invention because less water will have to be evaporated to cause the sodium sulfate to precipitate where using starting solutions containing appreciably more than 5 percent amino acid. Starting solutions containing about 20 percent or more amino acid are generally preferred. Obviously, starting solutions containing 1 percent or less amino acid can be used, but large amounts of water must be evaporated where using such solutions.

Starting aqueous slurries in which sodium sulfate is present as a solid phase can be used in place of starting aqueous solutions. Where using such slurries we generally prefer to heat the slurry to a temperature effective to prevent the precipitation of the amino acid and to dissolve any precipitated amino acid before separating the sodium sulfate. If necessary, additional water can be added to dissolve any solid amino acid present in the starting slurry.

We generally prefer to precipitate (and separate) the amino acid from our amino acid containing solutions at a temperature about 30°C (generally above about 32°C, or 33°C, or 35°C) to prevent precipitation of sodium sulfate. Because of our disclosure, one skilled in the art can readily determine operating temperatures for systems comprising or consisting essentially of glycine (or 62-alanine), sodium sulfate, and water.

If the pH of the starting solution (i.e., the aqueous solution consisting essentially of water, amino acid, and sodium sulfate) is not within the desired range (e.g. 4.5–8.5, 4.5–7, or 5.5–6.5), said pH can be adjusted before precipitating sodium sulfate therefrom. For example, $H_2SO_4$ can be added to lower the pH and NaOH can be added to increase the pH. Further, if at any time the pH of a solution, slurry, or mother liquor is not within the desired operating range (e.g., 4.5–8.5, 4.5–7, or 5.5–6.5), such pH can be adjusted — e.g., by adding sulfuric acid or sodium hydroxide.

We prefer to prepare our amino acid (glycine or β-alanine) from the corresponding nitrile according to the following sequence of reactions:

a. For Glycine:

$$H_2NCH_2CN + H_2O + NaOH = H_2NCH_2COONa + NH_3$$

$$2H_2NCH_2COONa + H_2SO_4 = 2H_2NCH_2COOH + Na_2SO_4$$

b. For β-Alanine:

$$H_2NCH_2CH_2CN + H_2O + NaOH = H_2NCH_2CH_2COONa + NH_3$$

$$2H_2NCH_2CH_2COONa + H_2SO_4 = 2H_2NCH_2CH_2COOH + Na_2SO_4$$

Where an excess of sodium hydroxide is added in the saponification step sufficient sulfuric acid is added in the acidification step to neutralize such excess (free) sodium hydroxide according to the following equation:

$$2NaOH + H_2SO_4 = Na_2SO_4 + 2H_2O$$

The pH can be adjusted during (or after) the acidification step to a level (pH 4.5–8.5 or 5.5–6.5, or 6) preferred for separating the amino acid.

If too much sulfuric acid is added during the acidification step or where adjusting the pH, the pH can be increased by neutralizing the excess acid with sodium hydroxide or with the sodium salt of the amino acid.

While it is preferred that the starting solution from which the amino acid (glycine or β-alanine) is recovered contain at least 5% amino acid, this value (5 percent) is not critical, and excellent results have been obtained with solutions containing less than about 5 percent of the amino acid. Solutions containing substantially less than 5 percent of the amino acid can be concentrated by evaporating water therefrom to bring their amino acid content to about 5 percent.

Of course, if the solution were evaporated too far and the concentration of the amino acid became too high, the amino acid would precipitate out at an elevated temperature. However, by noting the solubility of the amino acid (glycine or β-alanine) as a function of temperature, one skilled in the art can, because of this disclosure, readily avoid conditions under which the amino acid precipitates at elevated temperatures. For example, the solubility of glycine in water is 20.0 percent at 25°C, 23.0 percent at 35°C, and 36.1 percent at 80°C and the solubility of β-alanine in water is 45.8 percent at 35°C and 54.9 percent at 80°C.

An amino acid (glycine or β-alanine) separated by the process of this invention can, if desired, be washed, for example with cool or cold water (e.g., water having the temperature of about 5°–25°C or up to about 30°C) or, alternatively, with a solution of the appropriate amino acid (e.g., a saturated or nearly saturated aqueous solution of said amino acid).

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE 1

An aqueous ammoniacal solution of glycinonitrile containing 2,804 g (50 moles) of glycinonitrile was fed into an aqueous sodium hydroxide solution (20% sodium hydroxide) containing 2,040 g (51 moles) of sodium hydroxide at 50°–60°C. The resulting mixture was then boiled until free of ammonia. The resulting ammonia free sodium glycinate solution was cooled to 80°C, bleached with hydrogen peroxide (5 ml of 36% $H_2O_2$), treated with charcoal and filtered to remove color bodies, cooled to room temperature (ca. 25°C), and diluted to 12.13 Kg with water. The resulting aqueous solution consisted essentially of 40% sodium glycinate and 0.3% sodium hydroxide. Said solution was substantially free of disodium iminodiacetate and it contained only trace quantities of color bodies and other undesired side products of the hydrolysis. A starting aqueous solution having a pH of 6 and consisting essentially of water, sodium sulfate and glycine was formed by adding 93% sulfuric acid (2,662 g) to the aforesaid 12.13 Kg of sodium glycinate solution. Said starting aqueous solution was designated "Starting Solution No. 1."

EXAMPLE 2

A quantity (1,183 g) of Starting Solution No. 1 containing 4 moles (300 g) of glycine was boiled at atmospheric pressure to evaporate water therefrom to form a first slurry weighing 1,129 g and consisting essentially of crystalline anhydrous sodium sulfate and a solution of glycine sodium sulfate, and water. This slurry was centrifuged at 80°C. The separated sodium sulfate was dried, weighed (67 g), and then discarded. The hot separated mother liquor (first mother liquor) was cooled to 35°C to form a second slurry consisting essentially of precipitated (crystalline) glycine and a solution of glycine, sodium sulfate, and water. This second slurry was stirred at 35°C for 2 hours and centrifuged. The separated glycine was dried and weighed (132 g). The separated liquor (second mother liquor) was designated "Mother Liquor No. 2" and set aside for use in Run No. 1 of Example 3.

EXAMPLE 3

Run No. 1: Mother Liquor No. 1 was combined with a portion (1183 g) of Starting Solution No. 1. The resulting mixture was boiled at atmospheric pressure to evaporate water therefrom until the weight of the boiled mixture was reduced to 1,806 g. The resulting slurry was cooled to 80°C and centrifuged to remove sodium sulfate which was weighed (174 g) and discarded. The separated mother liquor (third mother liquor) was cooled to 35°C to precipitate glycine. The resulting slurry was stirred for 2 hours, while maintaining its temperature at 35°C, and centrifuged at 35°C to produce a product (glycine) which was weighed (203 g). The separated mother liquor (fourth mother liquor) was designated "Mother Liquor R-1" and set aside for use in Run No. 2 of this example (Example 3).

Run No. 2: The general procedure of Run No. 1 was repeated. However, in this instance the procedure was modified by replacing Mother Liquor No. 1 with Mother Liquor R-1 and the resulting mixture was boiled to reduce its weight to 2,194 g. The separated sodium sulfate weighed 211 g and the recovered glycine weighed 246 g. The mother liquor from which the glycine was recovered was designated "Mother Liquor R-2" and set aside for use in Run No. 3 of this example (Example 3).

Run Nos. 3–4: The general procedure of Run No. 1 was repeated in each of these runs. However, in Run No. 3 the procedure was modified by replacing Mother Liquor No. 1 with Mother Liquor R-2, and in Run No. 4 the procedure was modified by replacing Mother Liquor No. 1 with Mother Liquor R-3 (the mother liquor from which glycine was recovered in Run No. 3). In Run No. 3 the mixture of starting solution and Mother Liquor R-2 was boiled to reduce its weight to 2,435 g and in Run No. 4 the weight was reduced to 2584 g. The mother liquor from which glycine was recovered in Run No. 4 was designated "Mother Liquor R-4" and set aside for use in Run No. 5.

Table I shows the results of these runs (Runs 3 and 4).

TABLE I

| Run No. | Weight of Slurry, g (a) | Weight of Glycine Product, g | Weight of Sodium Sulfate Separated, g |
|---|---|---|---|
| 3 | 2434 | 273 | 234 |
| 4 | 2584 | 290 | 249 |

(a) This slurry consisted essentially of water, precipitated sodium sulfate, dissolved sodium sulfate, and dissolved glycine.

Run No. 5: The general procedure of Run No. 1 was repeated. However, in this instance the procedure was modified by replacing Mother Liquor No. 1 with 97 percent of Mother Liquor R-4 (the mother liquor from which glycine was recovered in Run No. 4). The remaining 3 percent of Mother Liquor No. 4 was discarded to prevent a build-up of impurities which occurred as impurities and side products in the original sodium glycinate solution. In this run (Run No. 5) water was evaporated from the mixture of starting solution and Mother Liquor R-4 to reduce its weight to 2,584 g and to precipitate sodium sulfate therefrom. The sodium sulfate separated in this run (Run No. 5) weighed 257 g and the recovered glycine weighed 271 g. The mother liquor from this run was designated "Mother Liquor R-5" and set aside for use in Run No. 6.

Runs Nos. 6–9: The general procedure of Run No. 5 was repeated in each of these runs. However, in Run No. 6, 97 percent of the mother liquor from which glycine had been recovered in Run No. 5 (i.e., Mother Liquor R-5) was used in place of Mother Liquor R-4, and in each of the subsequent runs (Runs 7–9) mother liquor from which glycine had been recovered in the preceeding run (i.e., mother liquor from Run No. 6 in the case of Run No. 7, mother liquor from Run No. 7 in the case of Run No. 8, and mother liquor from Run No. 8 in the case of Run No. 9) was used in place of the Mother Liquor R-4 used in Run No. 5.

Table II gives the results of these runs.

TABLE II

| Run No. | Weight of Slurry, g (a) | Weight of Glycine Product, g | Weight of $Na_2SO_4$ Separated, g |
|---|---|---|---|
| 6 | 2714 | 275 | 261 |
| 7 | 2758 | 280 | 267 |
| 8 | 2729 | 282 | 268 |
| 9 | 2797 | 284 | 269 |

(a) This slurry consisted essentially of water, precipitated sodium sulfate, dissolved sodium sulfate, and dissolved glycine.

The mother liquor from which the glycine was recovered in Run No. 9 was designated "Mother Liquor R-9" and analyzed for glycine and sodium sulfate. It (Mother Liquor R-9) was found to contain 416 g of glycine and 541 g of sodium sulfate. Mother Liquor R-9 can be used in place of Mother Liquor R-4 in a subsequent run using the general procedure of Run No. 5 of this example (Example 3), or it can be discarded, or it can be processed independently to yield glycine by evaporating water therefrom to precipitate sodium sulfate which can be separated at an elevated temperature (e.g., 75°–90°C) at which glycine is not precipitated, and the mother liquor from which this sodium sulfate was separated can be cooled (e.g., to 33°–40°C) to precipitate glycine which can be separated and recovered. If impure, the thus recovered glycine can be purified or used as crude or technical grade glycine.

Because of our disclosure, various other methods for disposing of Mother Liquor R-9 and for recovering the glycine therefrom will be readily apparent to those skilled in the art.

At the completion of Example 3 all glycine products obtained in Examples 2 and 3 were combined, admixed thoroughly, and analyzed. The thus formed mixture analyzed 97% glycine, 2.5% $Na_2SO_4$, and 0.5% moisture. Said mixture was recrystallized from water, recovered, and dried. The dried recrystallized product analyzed 99.9% glycine.

Because of our disclosure, it will also be readily apparent to those skilled in the art that the portions of Mother Liquors R-4 through R-8 which were discarded could be combined and processed to recover glycine therefrom. If the thus recovered glycine contains an excessive amount of impurities, it can be purified by conventional techniques or used as crude or technical grade glycine.

EXAMPLE 4

The general procedure of Example 1 was repeated. The starting solution consisting essentially of water, glycine, and sodium sulfate produced in this run was designated "Starting Solution No. 3."

EXAMPLE 5

Run No. 1: Water was evaporated from the entire lot of Starting Solution No. 3 by boiling said starting solution to form a first slurry consisting essentially of precipitated sodium sulfate and a first mother liquor consisting essentially of water, dissolved sodium sulfate, and dissolved glycine. The precipitated sodium sulfate was separated from the first mother liquor while maintaining the temperature of the system at about 90°C. The separated first mother liquor was cooled to 35°C to form a second slurry consisting essentially of precipitated glycine and a second mother liquor consisting essentially of water, dissolved sodium sulfate, and dissolved glycine. The precipitated glycine was separated from the second mother liquor while maintaining the temperature of the system at 35°C. The separated glycine was recovered and the separated mother liquor which was designated "Mother Liquor 4–1" was set aside for use in Run No. 2 of this example. The recovered glycine had a purity of 97.5 percent.

Run No. 2: The general procedure of Run No. 1 of this example (Example 4) was repeated. However, in this instance the procedure was modified by replacing Starting Solution No. 3 which was used in Run No. 1 with Mother Liquor 4–1. The recovered glycine had a purity of 97.1 percent and the mother liquor from which the glycine was separated in this run (Run No. 2) was designated "Mother Liquor 4–2" and set aside.

Mother Liquor 4–2 can be further processed (to recover more glycine therefrom) by repeating the general procedure of Run 2 of this example but modifying said procedure by replacing Mother Liquor 4–1 with Mother Liquor 4–2. Other methods for recovering glycine from Mother Liquor 4–2 will, because of our disclosure, be readily apparent to those skilled in the art.

EXAMPLE 6

An aqueous solution of β-aminopropionitrile ($NH_2CH_2CH_2CN$) containing 3,505 g (50 moles) of said nitrile was fed into an aqueous sodium hydroxide solution (20% sodium hydroxide) solution containing 2,040 g (51 moles) of sodium hydroxide at 50°–60°C. The resulting mixture was then boiled until free of ammonia. The resulting ammonia free sodium β-alaninate ($NH_2CH_2CH_2COONa$) solution was cooled to 80°C, bleached with hydrogen peroxide (5 ml of 36% $H_2O_2$), treated with charcoal and filtered to remove color bodies, cooled to room temperature (ca. 25°C), and diluted to 13.89 Kg with water. The resulting aqueous solution consisted essentially of 40% sodium β-alaninate and 0.3% sodium hydroxide. Said solution contained only trace quantities of color bodies and other undesired side products of the hydrolysis. A starting aqueous solution having a pH of 6 and consisting essentially of water, sodium sulfate and β-alanine was formed by adding 93% sulfuric acid (2687 g) to the aforesaid 13.89 Kg of sodium β-alaninate solution. Said starting aqueous solution was designated "Starting Solution No. 6."

EXAMPLE 7

A quantity (1326 g) of Starting Solution No. 6 containing 4 moles (356 g) of β-alanine was boiled at atmospheric pressure to evaporate water therefrom to form a first slurry weighing 994 g and consisting essentially of crystalline (precipitated) anhydrous sodium sulfate and a solution of β-alanine, sodium sulfate, and water. This slurry was centrifuged at 80°C. The separated sodium sulfate was dried, weighed (214 g), and then discarded. The hot separated mother liquor (first mother liquor) was cooled to 35°C to form a second slurry consisting essentially of precipitated (crystalline) β-alanine and a solution of β-alanine, sodium sulfate, and water. This second slurry was stirred at 35°C for 2 hours and centrifuged. The separated β-alanine was dried and weighed (96 g). The separated liquor (second mother liquor) was designated "Mother Liquor No. 7" and set aside for use in Run No. 1 of Example 8.

EXAMPLE 8

Run No. 1: Mother Liquor No. 7 was combined with a portion (1326 g) of Starting Solution No. 6. The resulting mixture was boiled at atmospheric pressure to evaporate water therefrom until the weight of the boiled mixture was reduced to 1,558 g. The resulting slurry was cooled to 80°C and centrifuged to remove precipitated sodium sulfate which was weighed (243 g) and discarded. The separated mother liquor (third mother liquor) was cooled to 35°C to precipitate β-alanine. The resulting slurry was stirred for 2 hours, while maintaining its temperature at 35°c, and centrifuged at 35°C to produce a product β-analine) which was dried and weighed (164 g). The separated mother liquor (fourth mother liquor) was designated "Mother Liquor A-1" and set aside for use in Run No. 2 of this example (Example 8).

Run No. 2: The general procedure of Run No. 1 was repeated. However, in this instance the procedure was modified by replacing Mother Liquor No. 7 with 97 percent of Mother Liquor A-1 (the mother liquor from which β-alanine was recovered in Run No. 1 of this example (Example 8)). The remaining 3 percent of Mother Liquor No. 1 was discarded to prevent a build up of impurities which occurred as impurities and side products in the original sodium β-alaninate solution. In this run (Run No. 2) water was evaporated from the mixture of starting solution and Mother Liquor A-1 to reduce its weight to 1,969 g and to precipitate sodium sulfate therefrom. The sodium sulfate separated in this run (Run No. 2) weighed 253 g and the recovered β-alanine weighed 214 g. The mother liquor from this run was designated "Mother Liquor A-2" and set aside for use in Run No. 3.

Runs 3–10: The general procedure for Run No. 2 of this example (Example 8) was repeated in each of these runs. However, in Run No. 6, 97% of the mother liquor from which β-alanine had been recovered in Run No. 2 (i.e., Mother Liquor A-2) was used in place of the Mother Liquor A-1 used in Run No. 2, and in each of the subsequent runs (Runs 4–10) 97 percent of the mother liquor from which β-alanine had been recovered in the preceeding run was used in place of the Mother Liquor A-2 which was used in Run No. 2 (i.e., in Run No. 4, mother liquor from which β-alanine had been separated in Run No. 3 was used, in Run No. 5 mother liquor from Run No. 4 was used, and in Run No. 6 mother liquor from Run No. 5 was used, etc.

Table III reports the results of these runs (Runs 3–10).

TABLE III

| Run No. | Weight of Slurry, g (a) | Weight of β-Alanine Product, g | Weight of Sodium Sulfate Separated, g |
|---|---|---|---|
| 3 | 2152 | 345 | 242 |
| 4 | 2241 | 300 | 361 |
| 5 | 2309 | 291 | 284 |
| 6 | 2405 | 291 | 269 |
| 7 | 2501 | 303 | 280 |
| 8 | 2557 | 312 | 272 |
| 9 | 2609 | 319 | 278 |
| 10 | 2641 | 222 | 281 |

(a) The slurry consisted essentially of water, precipitated sodium sulfate, dissolved sodium sulfate, and dissolved βalanine.

The mother liquor from which the β-alanine was recovered in Run No. 10 was designated "Mother Liquor A-10"; it was analyzed for β-alanine and sodium sulfate. It (Mother Liquor A-10) was found to contain 794 g of β-alanine and 224 g of sodium sulfate. Mother Liquor A-10 can be used in place of Mother Liquor A-1 in a subsequent run using the general procedure of Run No. 2 of this example (Example 8), or it can be discarded, or it can be processed independently to yield β-alanine by evaporating water therefrom to precipitate sodium sulfate which can be separated at an elevated temperature (e.g., 75°–90°C) at which β-alanine is not precipitated, and the mother liquor from which this sodium sulfate was separated can be cooled (e.g., to 33°–40°C) to precipitate β-alanine which can be separated and recovered. If impure, this recovered β-alanine can be purified or used as crude or technical grade β-alanine.

Because of our disclosure, various other methods for disposing of Mother Liquor A-10 and for recovering the β-alanine therefrom will be readily apparent to those skilled in the art.

Because of our disclosure, it will also be readily apparent to those skilled in the art that the portions of mother liquors which were discarded in Runs 2 through 10 could be combined and processed to recover β-alanine therefrom. If the thus recovered β-alanine contains an excessive amount of impurities, it can be purified by conventional techniques or used as crude or technical grade β-alanine. At the completion of Example 8 all β-alanine products obtained in Example 7 and in Runs 1–10 of Example 8 were combined, admixed thoroughly, and analyzed. The thus formed mixture analzyed 97.5% β-alanine, 2.2% $Na_2SO_4$, and 0.3% moisture. Said mixture was recrystallized from water, recovered, and dried. The dried recrystallized product analyzed 99.9% β-alanine.

EXAMPLE 9

The general procedure of Example 1 was repeated. The thus prepared starting solution consisting essentially of water, β-alanine, and sodium sulfate produced in this run was designated "Starting Solution No. 9."

EXAMPLE 10

Run No. 1: Water was evaporated from the entire lot of Starting Solution No. 9 by boiling said starting solution to form a first slurry consisting essentially of precipitated sodium sulfate and a first mother liquor consisting essentially of water, dissolved sodium sulfate, and dissolved β-alanine. The precipitated sodium sulfate was separated from the first mother liquor while maintaining the temperature of the system at about 90°C. The separated first mother liquor was cooled to 35°C to form a second slurry consisting essentially of precipitated β-alanine and a second mother liquor consisting essentially of water, dissolved sodium sulfate, and dissolved β-alanine. The precipitated β-alanine was separated from the second mother liquor while maintaining the temperature of the system at 35°C. The separated β-alanine recovered and the separated mother liquor (which was designated "Mother Liquor 10–1") was set aside for use in Run No. 2 of this example (Example 10). The recovered β-alanine had a purity of 98 percent.

Run No. 2: The general procedure of Run No. 1 of this example (Example 10) was repeated. However, in this instance the procedure was modifed by replacing Starting Solution No. 9 which was used in Run No. 1 with Mother Liquor 10–1. The recovered β-alanine had a purity of 97.8%, and the mother liquor from which the β-alanine was separated in this run (Run No. 2) was designated "Mother Liquor 10–2" and set aside.

Mother Liquor 10–2 can be further processed (to recover more β-alanine therefrom) by repeating the general procedure of Run No. 2 of this example but modifying said procedure by replacing Mother Liquor 10–1 with Mother Liquor 10–2. Other methods for recovering β-alanine from Mother Liquor 10–2 will, because of our disclosure, be readily apparent to those skilled in the art.

Glycine and β-alanine are both articles of commerce. Glycine is useful as an additive in metal plating baths, as a nutrient supplement for animal feeds and fermentation broths, and as a flavor enhancing agent in food, and β-alanine is used as a starting material in the synthesis of pantothenic acid (a vitamin) and salts and other derivatives thereof.

As used herein the term "percent (%)" means parts per hundred and parts means parts by weight unless otherwise defined where used.

As used herein the term "mole" has its generally accepted meaning. A mole of a substance is that quantity which contains the same number of molecules of the substance as there are atoms in 12 grams of pure $^{12}C$.

As used herein the term "g" means gram or grams and the term "Kg" means kilogram or kilograms. A kilogram is 1,000 grams.

We claim:

1. A process for recovering an amino acid selected from the group consisting of glycine and β-alanine from a starting aqueous solution consisting essentially of sodium sulfate, the amino acid, and water, the starting aqueous solution having a temperature above 33°C, a pH of 4.5–8.5, a mole ratio of amino acid to sodium sulfate of 1–5:1 and containing at least 5% of the amino acid, said process comprising:

a. forming a first slurry having a temperature effective for preventing precipitation of the amino acid, the first slurry being a mixture of precipitated sodium sulfate and a first mother liquor, the first mother liquor being a second aqueous solution consisting essentially of sodium sulfate, the amino acid, and water, by evaporating water from the starting aqueous solution while maintaining its temperature within a range effective for preventing the precipitation of the amino acid;

b. separating the first mother liquor from the precipitated sodium sulfate;

c. cooling the separated first mother liquor to a temperature within a range effective for precipitating the amino acid to form a second slurry, the second slurry being a mixture of precipitated glycine or β-alanine and a second mother liquor, the second mother liquor being a third aqueous solution consisting essentially of sodium sulfate, and amino acid, and water; and d. separating and recovering the precipitated amino acid.

2. The process of claim 1 in which the pH of the starting solution is 5.5–6.5.

3. The process of claim 1 in which the mole ratio of amino acid to sodium sulfate in the starting aqueous solution is 1–2:1.

4. The process of claim 1 in which the amino acid is glycine.

5. The process of claim 4 in which the starting aqueous solution analyzes 21–25% glycine.

6. The process of claim 1 in which the amino acid is β-alanine.

7. The process of claim 6 in which the starting aqueous solution contains 34–43% β-alanine.

8. The process of claim 1 in which at least a portion of second mother liquor from a previous run is admixed with the starting aqueous solution before evaporating water therefrom.

9. The process of claim 1 in which the starting aqueous solution analyzes at least 20% amino acid.

10. A process for recovering an amino acid selected from the group consisting of glycine and β-alanine from a starting aqueous solution consisting essentially of sodium sulfate, the amino acid, and water, the starting solution having a temperature above 33°C, a pH of 4.5–8.5, a mole ratio of the amino acid to sodium sulfate of 1–5:1 and analyzing at least 5% of the amino acid, said process comprising:
   a. forming a first slurry consisting essentially of a first crop of precipitated sodium sulfate and a first mother liquor by evaporating water from the starting aqueous solution at a temperature effective for preventing precipitation of the amino acid;
   b. separating the first crop of precipitated sodium sulfate from the first mother liquor at a temperature effective for preventing precipitation of the amino acid;
   c. forming a second slurry consisting essentially of a first crop of precipitated amino acid and a second mother liquor by cooling the separated first mother liquor to a temperature effective for precipitating the amino acid;
   d. separating the first crop of precipitated amino acid from the second mother liquor at a temperature effective for preventing the precipitated amino acid from redissolving;
   e. recovering the separated first crop of precipitated amino acid;
   f. forming a third slurry consisting essentially of a second crop of precipitated sodium sulfate and a third mother liquor by evaporating water from the separated second mother liquor at a temperature effective for preventing precipitation of the amino acid;
   g. separating the second crop of precipitated sodium sulfate from the third mother liquor at a temperature effective for preventing precipitation of the amino acid.
   h. forming a fourth slurry consisting essentially of a second crop of precipitated amino acid and a fourth mother liquor by cooling the separated fourth mother liquor to a temperature effective for precipitating the amino acid;
   e. separating the second crop of precipitated amino acid from the fourth mother liquor at a temperature effective for preventing the precipitated amino acid from redissolving; and
   j. recovering the separated second crop of precipitated amino acid.

11. The process of claim 10 in which the amino acid is glycine..

12. The process of claim 10 in which the amino acid is β-alanine.

13. A process for recovering an amino acid selected from the group consisting of glycine and β-alanine from a first aqueous starting solution consisting essentially of water, sodium sulfate, and the amino acid, the first starting solution having a temperature above 33°C, a pH of 4.5–8.5, a mole ratio of the amino acid to sodium sulfate of 1–5:1 and analyzing at least 5% of the amino acid, said process comprising:
   a. forming a first slurry consisting essentially of a first crop of precipitated sodium sulfate and a first mother liquor by evaporating water from the first aqueous starting solution at a temperature effective for preventing precipitation of the amino acid;
   b. separating the first crop of precipitated sodium sulfate from the first mother liquor at a temperature effective for preventing precipitation of the amino acid;
   c. forming a second slurry consisting essentially of a first crop of precipitated amino acid and a second mother liquor by cooling the separated first mother liquor to a temperature effective for precipitating the amino acid;
   d. separating the first crop of precipitated amino acid from the second mother liquor at a temperature effective for preventing the precipitated amino acid from redissolving;
   e. recovering the separated first crop of precipitated amino acid;
   f. forming a second aqueous starting solution consisting essentially of water, sodium sulfate, and the amino acid, the second starting solution having a pH of 4.5–8.5, by admixing at least part of the second separated mother liquor with a second portion of the first aqueous starting solution;
   g. forming a third slurry consisting essentially of a second crop of precipitated sodium sulfate and a third mother liquor by evaporating water from the second aqueous starting solution at a temperature effective for preventing precipitation of the amino acid;
   h. separating the second crop of precipitated sodium sulfate from the third mother liquor at a temperature effective for preventing precipitation of the amino acid;
   i. forming a fourth slurry consisting essentially of a second crop of precipitated amino acid and a fourth mother liquor by cooling the separated third mother liquor to a temperature effective for precipitating the amino acid;
   j. separating the second crop of precipitated amino acid from the fourth mother liquor at a temperature effective for preventing the precipitated amino acid from redissolving; and
   k. recovering the separated second crop of precipitated amino acid.

14. The process of claim 13 in which the amino acid is glycine.

15. The process of claim 13 in which the amino acid is β-alanine.

* * * * *